US011757326B2

(12) United States Patent
Seo et al.

(10) Patent No.: US 11,757,326 B2
(45) Date of Patent: Sep. 12, 2023

(54) BUSBAR UNIT FOR MOTOR

(71) Applicant: HYUNDAI MOBIS CO., LTD., Seoul (KR)

(72) Inventors: Yeong Woo Seo, Yongin-si (KR); Jong Bin Park, Yongin-si (KR); Jong Jin Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 110 days.

(21) Appl. No.: 17/319,398

(22) Filed: May 13, 2021

(65) Prior Publication Data
US 2021/0359570 A1    Nov. 18, 2021

(30) Foreign Application Priority Data

May 14, 2020   (KR) .......................... 10-2020-0057628

(51) Int. Cl.
*H02K 3/50*    (2006.01)
*H02K 3/52*    (2006.01)
*H02K 5/22*    (2006.01)

(52) U.S. Cl.
CPC ............... *H02K 5/225* (2013.01); *H02K 3/50* (2013.01); *H02K 3/52* (2013.01); *H02K 3/522* (2013.01); *H02K 2203/09* (2013.01)

(58) Field of Classification Search
CPC ...... H02K 3/50; H02K 3/522; H02K 2203/09; H02K 5/225; H02K 5/22; H02K 3/52; H02K 3/28; H02K 3/38; H02K 3/505; H02K 3/521

USPC .......................................................... 310/71
See application file for complete search history.

(56) References Cited

U.S. PATENT DOCUMENTS

| 6,930,418 B2 * | 8/2005 | Kobayashi ............. H02K 3/522 310/239 |
| 2011/0215662 A1 * | 9/2011 | Lee ........................... H02K 3/38 310/71 |
| 2016/0013697 A1 * | 1/2016 | Haga ........................ H02K 5/08 310/71 |

FOREIGN PATENT DOCUMENTS

| DE | 102016114723 A1 * | 2/2018 |
| WO | WO-2018038246 A1 * | 3/2018 | ............... H02K 3/28 |

OTHER PUBLICATIONS

Brunner Andreas, Electrical Substantially Annular Connection Device for a Stator of an Electric Motor, Feb. 15, 2018, DE 102016114723 (English Machine Translation) (Year: 2018).*
Yamaguchi et al, Motor, Mar. 1, 2018, WO 2018038246 (English Machine Translation) (Year: 2018).*

* cited by examiner

*Primary Examiner* — Alexander A Singh
(74) *Attorney, Agent, or Firm* — MORGAN, LEWIS & BOCKIUS LLP

(57) ABSTRACT

The present disclosure relates to a busbar unit for a motor, the busbar unit including: a holder having an inner circumferential surface on which crest portions and trough portions connected to the crest portions are formed; and a terminal coupled to the holder and including first terminal portions disposed on the crest portions, such that it is possible to obtain an advantageous effect of simplifying a structure and reducing costs.

20 Claims, 9 Drawing Sheets

BUSBAR UNIT FOR MOTOR

CROSS-REFERENCE TO RELATED APPLICATION

This application claims priority to and the benefit of Korean Patent Application No. 10-2020-0057628 filed in the Korean Intellectual Property Office on May 14, 2020, the entire contents of which are incorporated herein by reference.

TECHNICAL FIELD

The present disclosure relates to a busbar unit for a motor, and more particularly, to a busbar unit for a motor, which may have a simplified structure and reduce costs.

BACKGROUND ART

A hybrid vehicle or an electric vehicle, which is called an environmentally friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes a stator core formed by stacking electrical steel sheets, and a stator coil wound around the stator core.

A busbar is provided at an upper side (or a lower side) of the stator, and the stator coil is connected to an external power source through the busbar.

The busbar is structured to include a plurality of terminals inside a ring-shaped holder, and the terminals are provided by a combination of phase terminals connected to U-phase, V-phase, and W-phase power sources, and a neutral terminal that connects the phase terminals.

A first terminal portion of the terminal is fused with the stator coil. After the first terminal portion of the terminal is fused with the stator coil, an insulating material (e.g., epoxy) for insulation between the terminals is applied to cover the first terminal portion of the terminal.

Meanwhile, as the amount of the insulating material to be used to make insulation between the terminals increases, not only a weight of the motor increases, but also costs increase, and the time required to cure the insulating material increases, which causes a deterioration in manufacturing efficiency. Therefore, it is necessary to minimize the amount of the insulating material to be used while ensuring insulation performance.

Recently, various studies are conducted to simplify a structure and a manufacturing process while ensuring insulation performance, but the research result is still insufficient. Accordingly, there is a need for development of a technology for simplifying a structure and a manufacturing process while ensuring insulation performance.

SUMMARY

The present disclosure has been made in an effort to provide a busbar unit for a motor, which may have a simplified structure and reduce costs.

The present disclosure has also been made in an effort to simplify a structure of a holder and reduce a weight of the holder while ensuring insulation performance.

The present disclosure has also been made in an effort to improve stability and reliability and increase a creeping distance between terminals without changing a structure in which the terminals are disposed.

The present disclosure has also been made in an effort to simplify a manufacturing process and reduce manufacturing time.

The object to be achieved by the embodiment is not limited to the above-mentioned objects, but also includes objects or effects that may be recognized from the solutions or the embodiments described below.

In one aspect, the present disclosure provides a busbar unit for a motor, the busbar unit including: a holder having an inner circumferential surface including crest portions and trough portions connected to the crest portions disposed thereon; and a terminal coupled to the holder and including first terminal portions disposed on the crest portions.

This is to simplify a structure of the busbar unit and reduce costs.

That is, as the amount of an insulating material to be used to make insulation between the terminals increases, not only a weight of the motor increases, but also costs increase, and the time required to cure the insulating material increases, which causes a deterioration in manufacturing efficiency. Therefore, it is necessary to minimize the amount of the insulating material to be used while ensuring insulation performance.

However, in the related art, because an inner circumferential surface of a holder for supporting and insulating the plurality of terminals (an inner circumferential surface facing an outer circumferential surface of a rotor) is formed in a circular shape having a predetermined diameter, there is a problem in that it is difficult to reduce a size of the holder to a certain degree or more and it is difficult to reduce the amount of the insulating material to be used.

In particular, in the related art, not only an inner surface of the holder corresponding to a portion where first terminal portions of the terminal are disposed is formed in a circular shape having a predetermined diameter, but also an inner surface of the holder corresponding to a region between the adjacent first terminal portions is formed in a circular shape having a predetermined diameter, and as a result, there is a problem in that a weight of the holder increases and the amount of the insulating material used to cover the first terminal portions of the terminal increases.

However, according to the embodiment of the present disclosure, the inner circumferential surface of the holder is formed in a noncircular shape having the crest portions and the trough portions, and the first terminal portions of the terminal are disposed on the crest portions, such that it is possible to eliminate an unnecessary portion from a region between the adjacent first terminal portions while ensuring insulation performance between the terminals. As a result, it is possible to obtain an advantageous effect of reducing the amount of the insulating material to be used to form the holder, decreasing an overall weight of the holder, and reducing costs.

The holder may have various structures each having the inner circumferential surface on which the crest portions and the trough portions are disposed.

According to the exemplary embodiment of the present disclosure, the holder may include: a first body having an accommodation space at an upper side thereof and having an inner circumferential surface on which the crest portions and the trough portions are disposed; and a second body connected to the first body and to which the terminal is fixed, and the first terminal portions may protrude from an inner circumferential surface of the second body, and may be disposed in the accommodation space and arranged at positions corresponding to the crest portions, respectively.

In particular, the plurality of crest portions and the plurality of trough portions may be provided on the inner circumferential surface of the first body and disposed alternately in a circumferential direction of the holder.

According to the exemplary embodiment of the present disclosure, the terminal may include: a body accommodated in the holder; and a second terminal portion extending from the body and protruding from an outer circumferential surface of the holder, and the first terminal portions may extend from the body.

According to the exemplary embodiment of the present disclosure, the busbar unit for a motor may include a cover layer disposed on an upper surface of the holder and covering the first terminal portions.

In particular, the cover layer may include an insulating material filling the accommodation space provided at the upper side of the first body.

As described above, according to the embodiment of the present disclosure, because the inner circumferential surface of the holder is formed in a noncircular shape including the crest portions and the trough portions, the cover layer, which is formed on the upper surface of the holder so as to cover the first terminal portions of the terminal, may also be formed in a shape corresponding to the inner circumferential surface of the holder (the inner circumferential surface including the crest portions and the trough portions). As a result, it is possible to obtain an advantageous effect of reducing the amount of the insulating material to be used to form the cover layer and further reducing the time required to cure the cover layer.

According to the exemplary embodiment of the present disclosure, the holder may include a protrusion portion protruding from an inner surface of the accommodation space.

Since the protrusion portion protrudes from the inner surface of the accommodation space as described above, a volume of the accommodation space may be further reduced, such that the amount of the insulating material used to fill the accommodation space may be further reduced. Therefore, it is possible to obtain an advantageous effect of further reducing the time required to cure the cover layer.

The protrusion portion may be provided at various positions in accordance with required conditions and design specifications. For example, the protrusion portion may be disposed on at least one of the upper surface of the first body or the inner circumferential surface of the second body.

In particular, the protrusion portion may be disposed between adjacent first terminal portions. Since the protrusion portion is disposed between the adjacent first terminal portions as described above, it is possible to further reduce the volume of the accommodation space.

According to another embodiment of the present disclosure, the protrusion portion may be provided in plural, and the plurality of protrusion portions may be respectively arranged between adjacent first terminal portions.

According to the exemplary embodiment of the present disclosure, the busbar unit for a motor may include a support portion disposed on the outer circumferential surface of the holder and configured to support the second terminal portion.

In particular, a stepped portion is disposed at an end of the support portion, and the second terminal portion is exposed to an outside through the stepped portion.

More particularly, the stepped portion may be provided in plural, and the plurality of stepped portions are arranged in a stepwise manner at the end of the support portion such that the stepped portions are placed at different distances from the outer circumferential surface of the holder in a direction in which the second terminal portion protrudes. The plurality of stepped portions have different cross-sectional areas from one another.

Since the stepped portions are formed in a stepwise manner at the end of the support portion as described above, a creeping distance between the second terminal portions may be increased. As a result, it is possible to obtain an advantageous effect of minimizing defective insulation and improving stability and reliability.

This is based on the fact that an electric current applied to the terminal flows along the surface of the support portion. Since the stepped portion is formed at the end of the support portion, a distance (route) by which the electric current flows may be further increased. As a result, it is possible to obtain an advantageous effect of further increasing the creeping distance between the second terminal portions.

DETAILED DESCRIPTION

Figure 1:
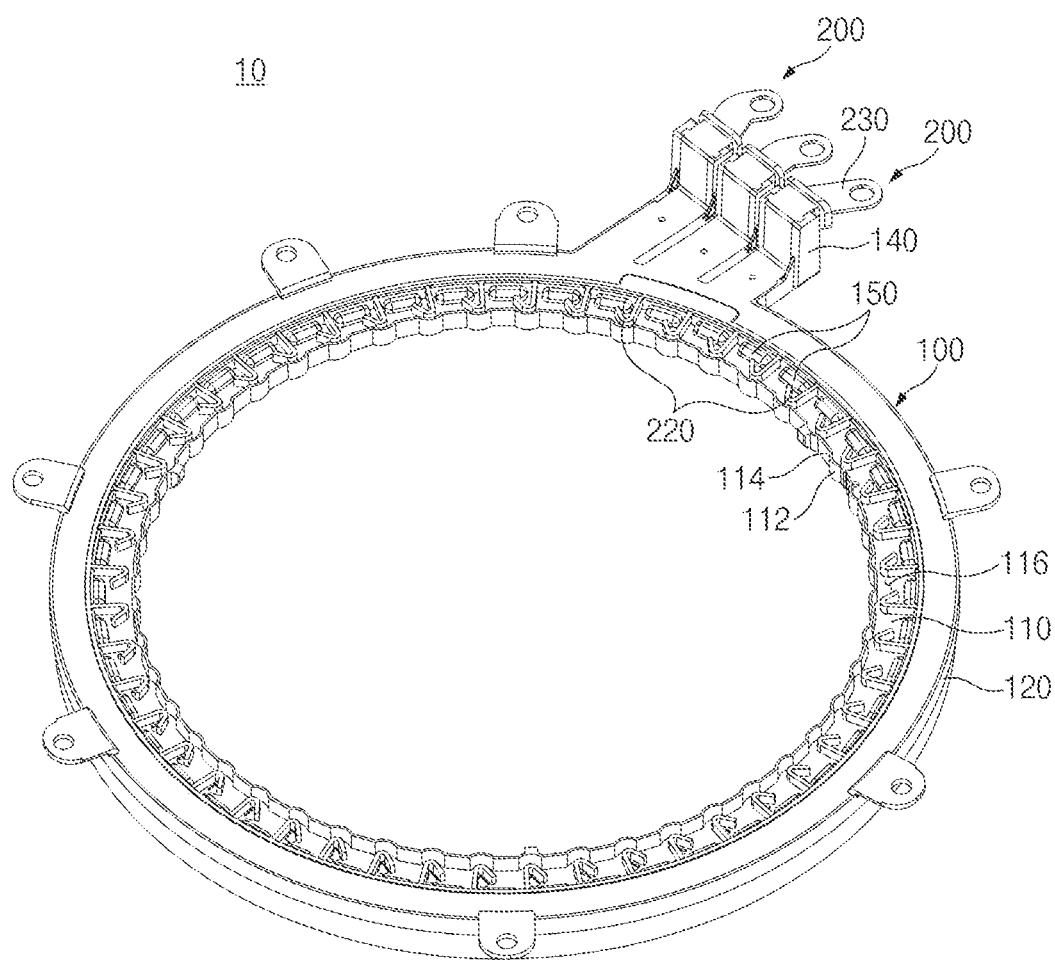
FIG. 1 is a perspective view for explaining a busbar unit for a motor according to an embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiment of the present disclosure are for explaining the embodiments, not for limiting the present disclosure.

Unless particularly stated otherwise in the context of the present specification, a singular form may also include a plural form. The explanation "at least one (or one or more)

of A, B, and C" described herein may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Referring to FIGS. 1 to 6, a busbar unit 10 for a motor according to an embodiment of the present disclosure includes: a holder 100 having an inner circumferential surface on which crest portions 112 and trough portions 114 connected to the crest portions 112 are formed; and a terminal 200 coupled to the holder 100 and including first terminal portions 220 disposed on the crest portions 112.

For reference, the busbar unit 10 for a motor according to the embodiment of the present disclosure may be mounted on various types of motors in accordance with required conditions and design specifications, and the present disclosure is not restricted or limited by the type and the structure of the motors.

For example, a motor, to which the busbar unit 10 according to the embodiment of the present disclosure is applied, may be used as a drive motor for an environmentally friendly vehicle, such as a hybrid vehicle and/or an electric vehicle, which obtains driving power from electrical energy.

For example, the drive motor is an inner-rotor-type synchronous motor and includes a stator (not illustrated) installed in a motor housing (not illustrated), and a rotor (not illustrated) rotatably installed in the stator with a predetermined air gap from the stator. The busbar unit 10 according to the embodiment of the present disclosure is connected to the stator.

The stator may be accommodated in the housing (not illustrated), and a coil (not illustrated) configured to induce an electrical interaction between the stator and the rotor is wound around the stator.

For example, the stator may include a stator core (not illustrated) including a plurality of teeth. The stator core may have an annular yoke (not illustrated) and the teeth (not illustrated) around which the coil is wound in a direction from the yoke to a center of the stator core. Further, the stator core may be made by stacking a plurality of plates each provided in the form of a thin steel sheet. In addition, the stator core may be provided by coupling or connecting a plurality of split cores.

The rotor is provided to be rotated by the electrical interaction between the stator and the rotor.

As an example, the rotor may include a rotor core (not illustrated) and magnets (not illustrated). The rotor core may be structured by stacking a plurality of circular plates each provided in the form of a thin steel sheet or structured in the form of a bin.

A hole (not illustrated), to which a shaft is coupled, may be provided at a center of the rotor. Protrusions (not illustrated), which guide the magnets, may protrude from an outer circumferential surface of the rotor core. The magnets may be attached to the outer circumferential surface of the rotor core so as to be spaced apart from one another at predetermined intervals in a circumferential direction of the rotor core.

In addition, the rotor may include a can member (not illustrated) disposed to surround the magnets to prevent the deviation of the magnets.

Figure 2:
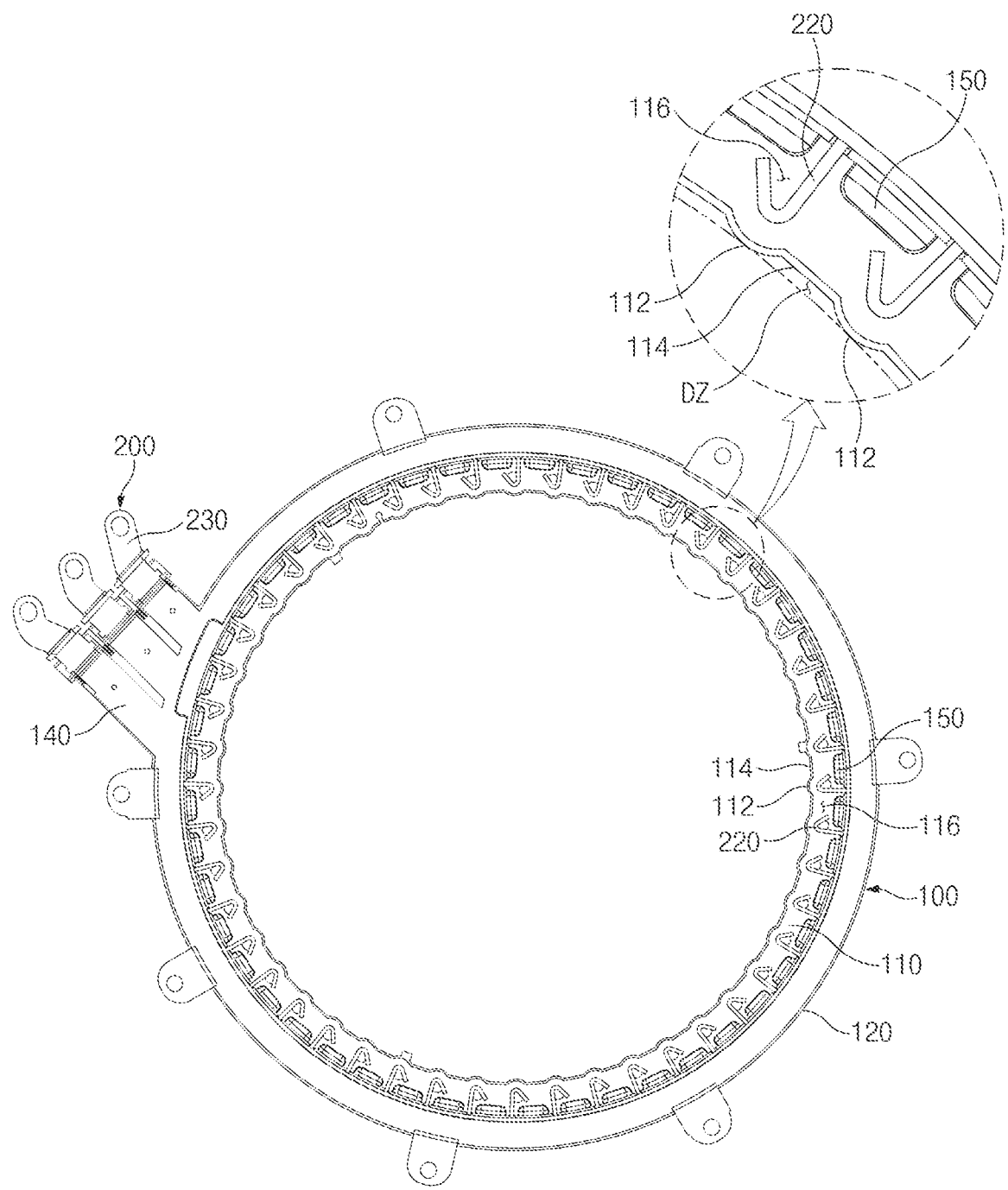
FIG. 2 is a top plan view for explaining the busbar unit for a motor according to the embodiment of the present disclosure.

Referring to FIGS. 1 and 2, the busbar unit 10 includes the holder 100 having the inner circumferential surface on which the crest portions 112 and the trough portions 114 are formed, and the terminal 200 coupled to the holder 100 and including the first terminal portions 220 disposed on the crest portions 112. The terminal 200 is electrically connected to the coil of the stator.

The busbar unit 10 may be disposed at an upper side of the stator or a lower side of the stator, and the position at which the busbar unit 10 is mounted may be variously changed in accordance with required conditions and design specifications.

The material and the shape of the holder 100 may be variously changed in accordance with required conditions and design specifications, and the present disclosure is not restricted or limited by the material and the shape of the holder 100.

For example, the holder 100 may be formed to have a hollow ring shape and provided as a molded product (made of an insulating material, for example) formed by injection molding.

The holder 100 may have various structures each having the crest portions 112 and the trough portions 114 formed on the inner circumferential surface thereof, and the present disclosure is not restricted or limited by the structure and the shape of the holder 100.

According to the exemplary embodiment of the present disclosure, the holder 100 includes a first body 110 having the crest portions 112 and the trough portions 114 formed on the inner circumferential surface thereof and having an accommodation space 116 at an upper side thereof, and a second body 120 connected to the first body 110 and to which the terminal 200 is fixed.

More specifically, the first body 110 is formed in a ring shape, and the crest portions 112 and the trough portions 114 connected to the crest portions 112 are formed on the inner circumferential surface of the first body 110.

For reference, in the present disclosure, the crest portion 112 may be defined as a portion which relatively protrudes from the inner circumferential surface of the first body 110 toward a center of the first body 110 (the center of the rotor). In addition, in the present disclosure, the trough portion 114 may be defined as a portion which is relatively recessed from the inner circumferential surface of the first body 110 toward the outside of the first body 110 (from the inside of the first body 110 toward the outside of the first body 110 in a diameter direction).

In particular, the plurality of crest portions 112 and the plurality of trough portions 114 may be provided on the inner circumferential surface of the first body 110 and disposed alternately in a circumferential direction of the holder 100. The plurality of crest portions 112 and the plurality of trough portions 114 may be connected in a ring shape to define a continuous waveform.

In the embodiment of the present disclosure illustrated and described above, an example in which the crest portion 112 is formed in a curved shape (arc shape) having a predetermined diameter is described. However, according to another embodiment of the present disclosure, the crest portion may be formed in a pointy shape or a polygonal shape (e.g., a quadrangular or trapezoidal shape).

In addition, the accommodation space 116 is provided at the upper side of the first body 110, and the first terminal portions 220 of the terminal 200 may be disposed in the accommodation space 116.

The second body 120 is connected to the first body 110 to fix the terminal 200. For example, the second body 120 may be provided in an outer edge region of the upper side of the first body 110 (based on FIG. 1) so as to be placed at a level different from a level at which the first body 110 is placed. For reference, the second body 120 may be formed integrally with the first body 110 or provided separately from the first body 110 and then coupled to the first body 110.

The first terminal portions 220 of the terminal 200 protrude from an inner circumferential surface of the second body 120, and the first terminal portions 220 are disposed in the accommodation space 116 so as to correspond to the crest portions 112.

In this case, it can be understood that the configuration in which the first terminal portions 220 are disposed to correspond to the crest portions 112 means that the crest portions 112 and the first terminal portions 220 are disposed in almost the same line in the diameter direction of the holder 100.

The terminal 200 is provided to electrically connect the coil of the stator to an external power source.

For example, the terminal 200 may be at least any one of phase terminals (a U-phase terminal, a V-phase terminal, and a W-phase terminal) connected to a U-phase power source, a V-phase power source, and a W-phase power source and a neutral terminal for electrically connecting the phase terminals.

Figure 3:
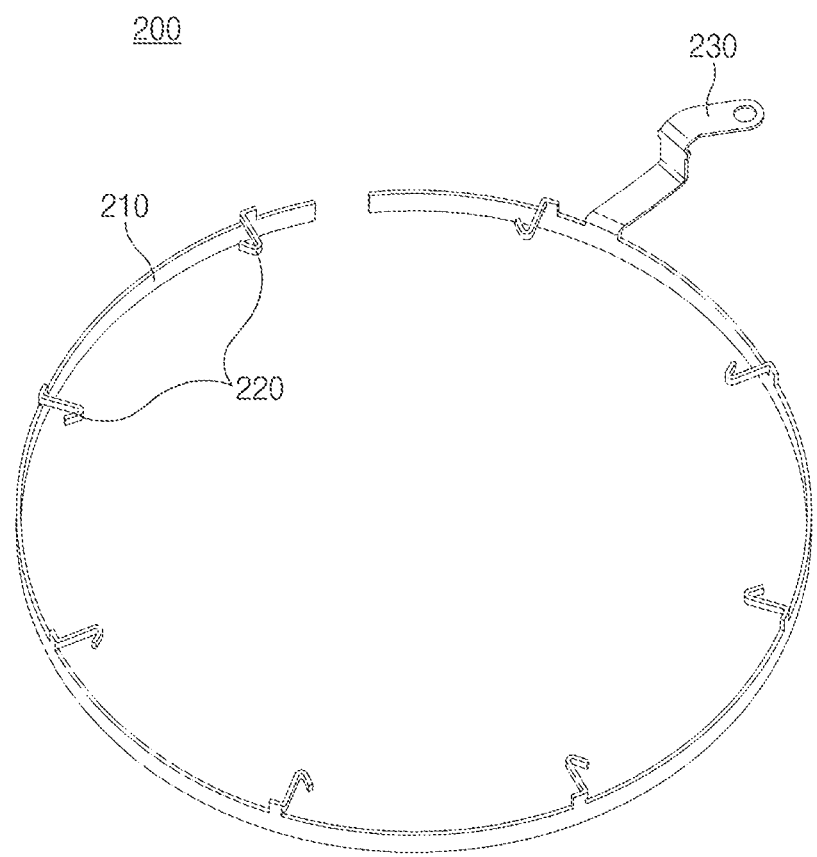
FIG. 3 is a view for explaining a terminal of the busbar unit for a motor according to the embodiment of the present disclosure.
Figure 4:
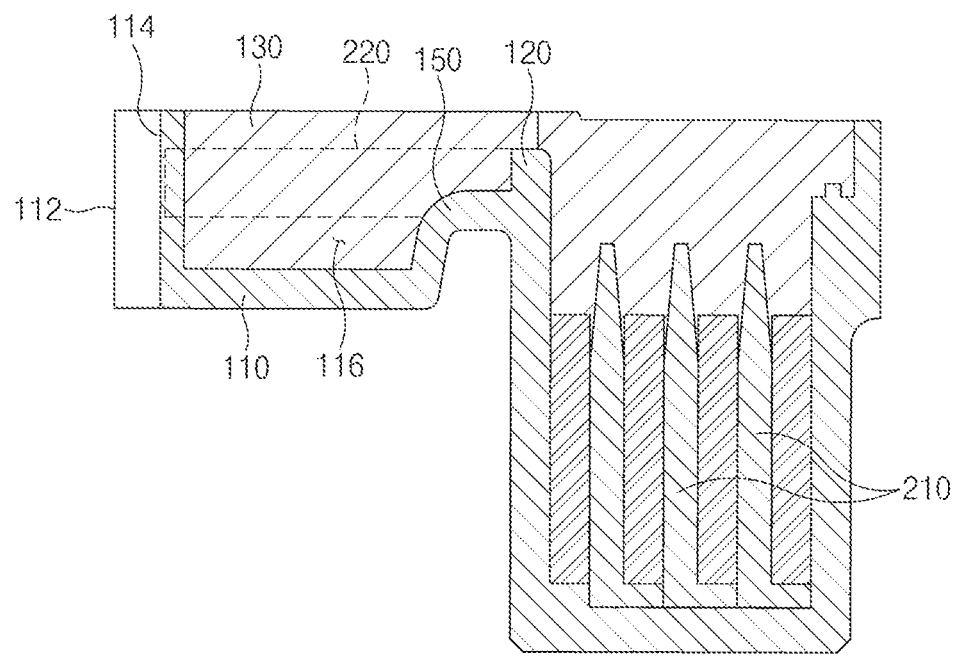
FIG. 4 is a view for explaining a cover layer of the busbar unit for a motor according to the embodiment of the present disclosure.

More specifically, referring to FIG. 3, the terminal 200 may include a body 210 accommodated in the holder 100, a second terminal portion 230 extending from the body 210 and protruding from an outer circumferential surface of the holder 100, and the plurality of first terminal portions 220 extending from the body 210 and protruding from the inner circumferential surface of the second body 120.

The structure and the shape of the body 210 may be variously changed in accordance with required conditions and design specifications. For example, the body 210 may have a single-layered structure and may be provided as a band member in the form of an arc (or a ring) having a predetermined curvature. According to another embodiment of the present disclosure, the body may have a double-layered structure (multilayer structure) having a bent portion.

The second terminal portion 230 extends from an outer surface of the body 210 and protrudes from the outer circumferential surface of the holder 100. The second terminal portion 230 is electrically connected to external power cables corresponding to respective phases (the U-phase, the V-phase, and the W-phase).

The first terminal portions 220 extend from an inner surface of the body 210 and protrude from the inner circumferential surface of the second body 120. In particular, an end of the first terminal portion 220 has a bent shape like a hook, and the coil of the stator may be fused with the end of the first terminal portion 220.

As described above, according to the embodiment of the present disclosure, the crest portions 112 and the trough portions 114 are formed on the inner circumferential surface of the holder 100, the first terminal portions 220 of the terminal 200 are disposed on the crest portions 112, and as a result, an overall size and an overall weight of the holder 100 may be reduced.

That is, referring to FIG. 2, according to the embodiment of the present disclosure, the crest portion 112 is formed by allowing only a region of the inner circumferential surface of the holder 100, in which the first terminal portion 220 is disposed, to protrude, and the trough portion 114 is formed in a region of the inner circumferential surface of the holder 100 which corresponds to the region between the adjacent first terminal portions 220. As a result, it is possible to eliminate an unnecessary portion DZ from the region between the adjacent first terminal portions 220 while ensuring insulation performance between the terminals 200. Accordingly, it is possible to obtain an advantageous effect of reducing the amount of the insulating material to be used to form the holder 100, decreasing an overall weight of the holder 100, and reducing costs.

According to the exemplary embodiment of the present disclosure, the busbar unit 10 for a motor includes a cover layer 130 formed on an upper surface of the holder 100 so as to cover the first terminal portions 220.

The cover layer 130 is provided to protect the first terminal portions 220 from an external environment and insulate the adjacent terminals 200.

For example, the cover layer 130 may be formed by filling the accommodation space 116 provided at the upper side of the first body 110 with an insulating material (e.g., epoxy) and then curing the insulating material.

As described above, according to the embodiment of the present disclosure, because the inner circumferential surface of the holder 100 is formed in a noncircular shape including the crest portions 112 and the trough portions 114, the cover layer 130, which is formed on the upper surface of the holder 100 so as to cover the first terminal portions 220 of the terminal 200, may also be formed in a shape corresponding to the inner circumferential surface of the holder 100 (the inner circumferential surface including the crest portions 112 and the trough portions 114). As a result, it is possible to obtain an advantageous effect of reducing the amount of the insulating material to be used to form the cover layer 130 and further reducing the time required to cure the cover layer 130.

According to the exemplary embodiment of the present disclosure, the holder 100 may include protrusion portions 150 protruding from an inner surface of the accommodation space 116.

As described above, since the protrusion portions 150 protrude from the inner surface of the accommodation space 116, a volume of the accommodation space 116 may be further reduced, such that the amount of the insulating material used to fill the accommodation space 116 may be further reduced. Therefore, it is possible to obtain an advantageous effect of further reducing the time required to cure the cover layer 130.

The protrusion portions 150 may be provided at various positions in accordance with required conditions and design specifications, and the present disclosure is not restricted or limited by the positions of the protrusion portions 150.

For example, the protrusion portions 150 may be formed on at least any one of the upper surface of the first body 110 and the inner circumferential surface of the second body 120. For example, referring to FIG. 4, the protrusion portion 150 may be formed over the upper surface of the first body 110 and the inner circumferential surface of the second body 120 (i.e., formed in an edge region in which the upper surface of the first body 110 and the inner circumferential surface of the second body 120 adjoin each other) so as to define a structure having a vacant inner part.

In particular, the protrusion portion 150 is disposed between the adjacent first terminal portions 220. Since the protrusion portion 150 is disposed between the adjacent first terminal portions 220 as described above, it is possible to further reduce the volume of the accommodation space 116. According to another embodiment of the present disclosure, the first terminal portion may penetrate the protrusion portion and then be disposed in the accommodation space.

Figure 5:
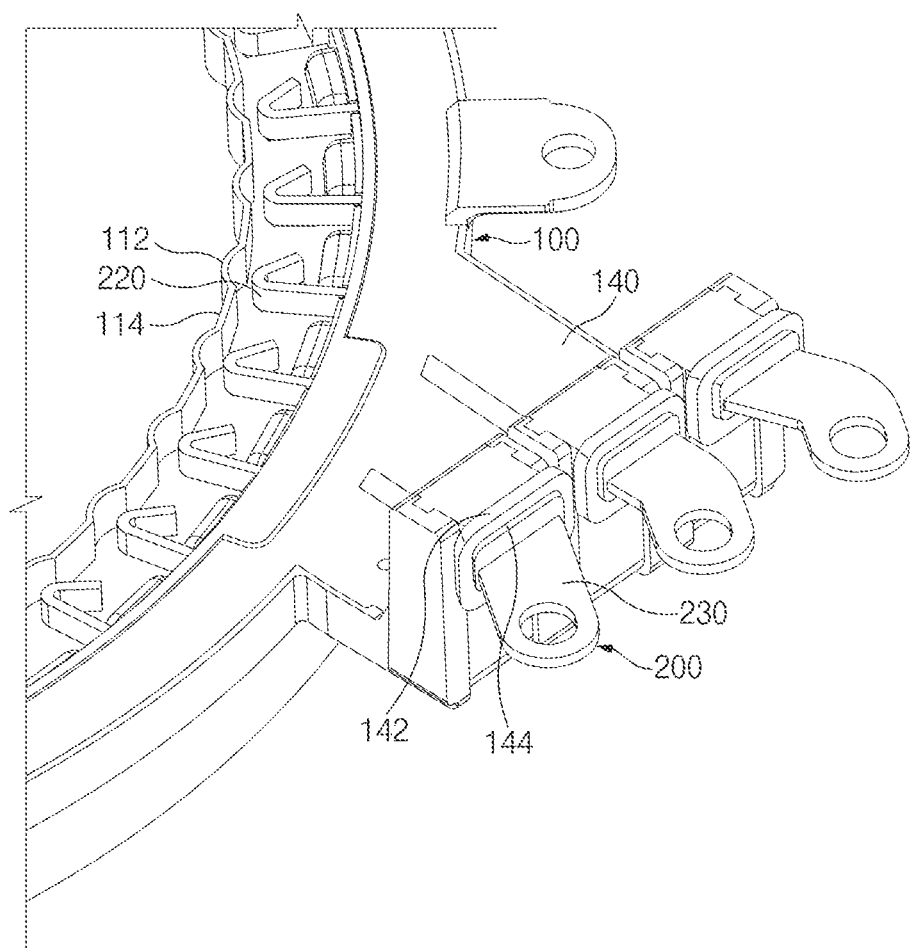
FIGS. 5 and 6 are views for explaining stepped portions of the busbar unit for a motor according to the embodiment of the present disclosure.
Figure 6:
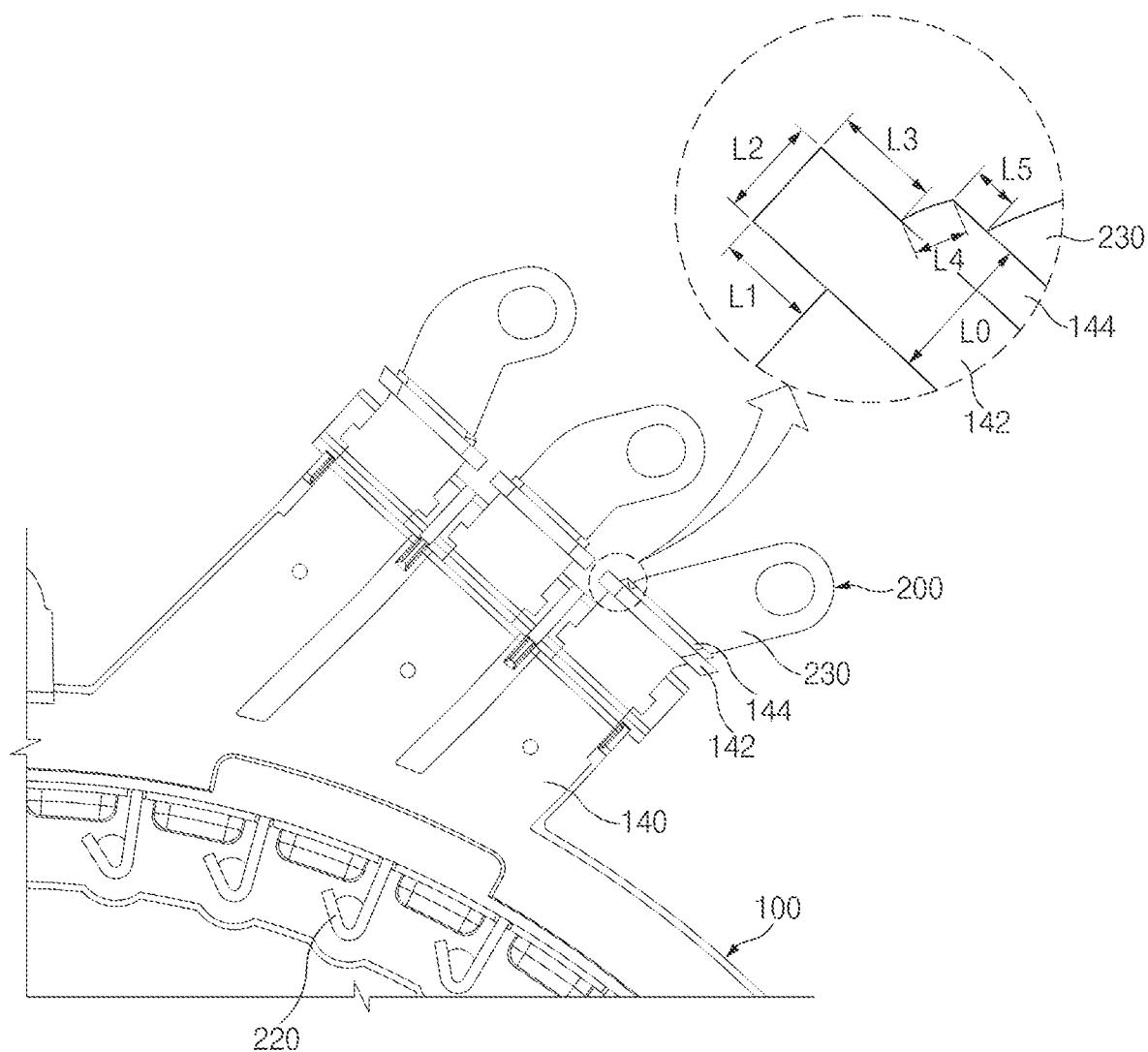

Referring to FIGS. 5 and 6, according to the exemplary embodiment of the present disclosure, the busbar unit 10 for a motor may include a support portion 140 provided on the outer circumferential surface of the holder 100 and configured to support the second terminal portion 230.

For example, the support portion 140 may be formed integrally with the outer circumferential surface of the holder 100 (e.g., the outer circumferential surface of the second body 120). In some instances, the support portion may be separately manufactured from the holder and then coupled to the outer circumferential surface of the holder.

For example, the second terminal portions 230 of the respective phase terminals (the U-phase terminal, the V-phase terminal, and the W-phase terminal) may be supported on the support portion 140 provided on the outer circumferential surface of the holder 100.

In particular, stepped portions 142 and 144 are formed at an end of the support portion 140, and the second terminal portion 230 is exposed to the outside through the stepped portions 142 and 144.

In particular, the plurality of stepped portions 142 and 144 is stacked in a stepwise manner at the end of the support portion 140 so that the stepped portions 142 and 144 are placed at different distances from the outer circumferential surface of the holder 100 in a direction in which the second terminal portion 230 protrudes. The plurality of stepped portions 142 and 144 has different cross-sectional areas.

Since the stepped portions 142 and 144 are formed at the end of the support portion 140 as described above, a creeping distance between the second terminal portions 230 may be increased. As a result, it is possible to obtain an advantageous effect of minimizing defective insulation and improving stability and reliability.

This is based on the fact that an electric current applied to the terminal 200 flows along the surface of the support portion 140. Since the stepped portions 142 and 144 are formed at the end of the support portion 140, a distance (route) by which the electric current flows may be further increased. As a result, it is possible to obtain an advantageous effect of further increasing the creeping distance between the second terminal portions 230.

In other words, referring to FIG. 6, since the plurality of stepped portions 142 and 144 is formed in a stepwise manner at the end of the support portion 140, a total sum of movement distances of the electric current flowing along the surfaces of the stepped portions 142 and 144 may be 'L1+L2+L3+L4+L5'. As described above, in comparison with a distance L0 by which an electric current flows in a case in which no separate stepped portions 142 and 144 are formed, the electric current may flow along the significantly long route (L1+L2+L3+L4+L5 > L0). As a result, it is possible to obtain an advantageous effect of increasing the creeping distance between the second terminal portions 230 and minimizing defective insulation.

Figure 7:
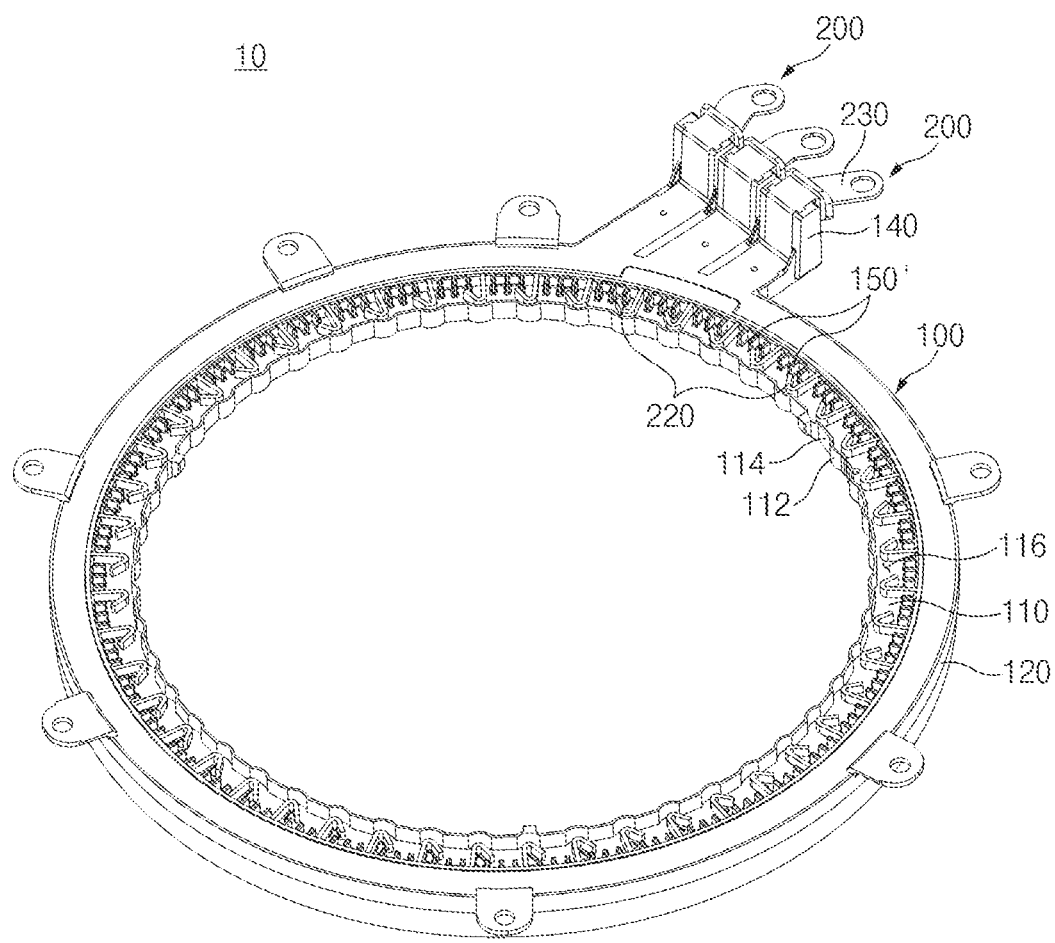
FIGS. 7 to 9 are views for explaining another example of the busbar unit for a motor according to the embodiment of the present disclosure.
Figure 8:
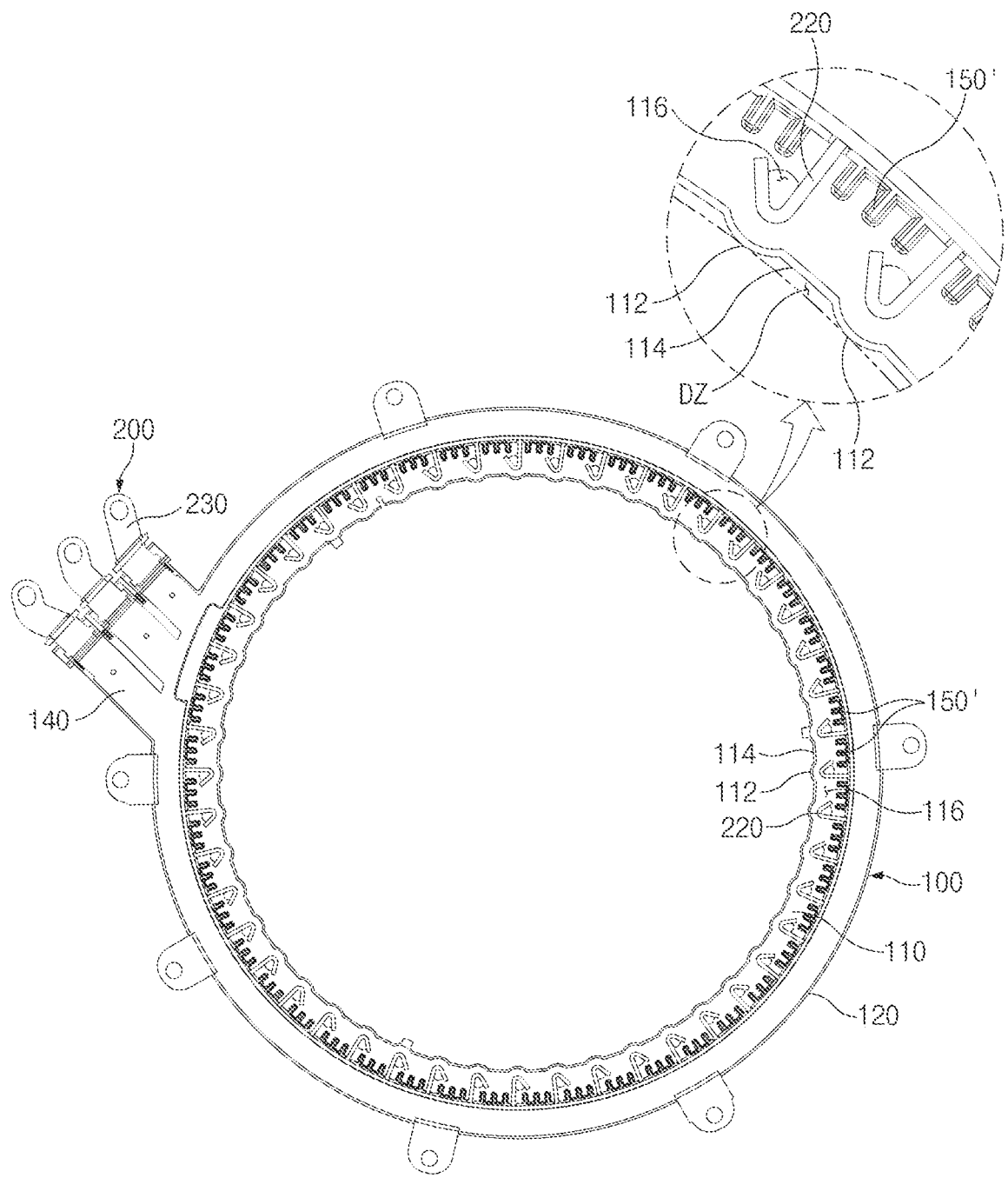
Figure 9:
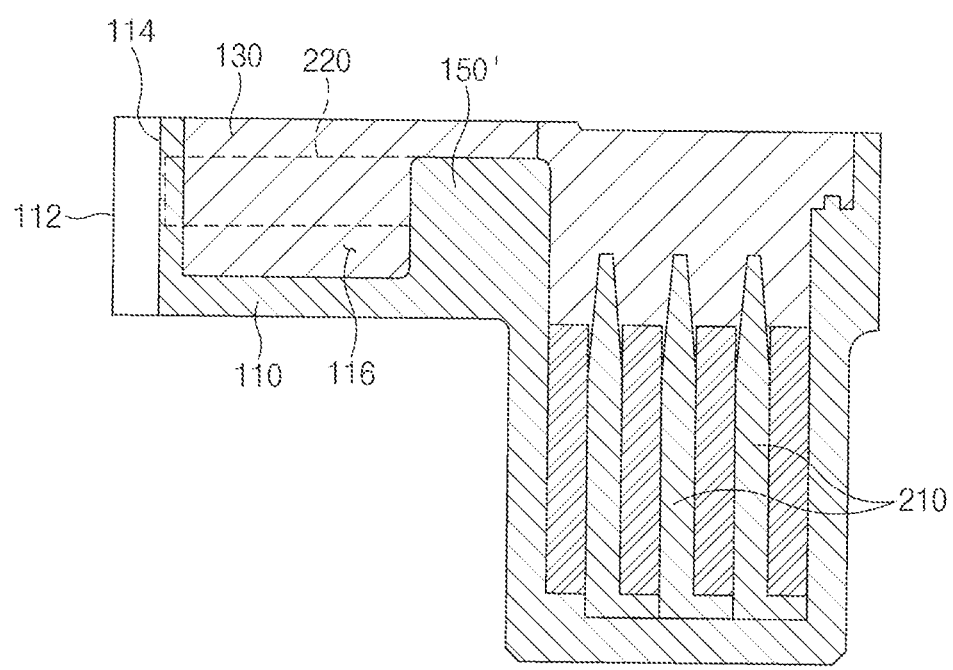

Meanwhile, FIGS. 7 to 9 are views for explaining another example of the busbar unit 10 for a motor according to the embodiment of the present disclosure. Further, the parts identical and equivalent to the parts in the above-mentioned configuration will be designated by the identical or equivalent reference numerals, and detailed descriptions thereof will be omitted.

In the embodiment of the present disclosure illustrated and described above, an example in which only the single protrusion portion 150 is provided between the adjacent first terminal portions 220 is described. However, according to another embodiment of the present disclosure, a plurality of protrusion portions 150' may be provided between the adjacent first terminal portions 220.

Referring to FIGS. 7 to 9, the holder 100 may include the plurality of protrusion portions 150' protruding from the inner surface of the accommodation space 116 and disposed to be spaced apart from one another between the adjacent first terminal portions 220.

For example, the three protrusion portions 150' may be disposed between the adjacent first terminal portions 220 so as to be spaced apart from one another.

In particular, the plurality of protrusion portions 150' may be provided in the form of a thin rib having a solid inner part.

In the embodiment of the present disclosure, an example in which the protrusion portion 150' is provided in a straight shape is described. However, according to another embodiment of the present disclosure, the protrusion portion may be provided in a curved shape or other shapes, and the present disclosure is not restricted or limited by the shape and the structure of the protrusion portion.

According to the embodiment of the present disclosure as described above, it is possible to obtain an advantageous effect of simplifying the structure and reducing costs.

In particular, according to the embodiment of the present disclosure, it is possible to obtain an advantageous effect of ensuring insulation performance, simplifying the structure of the holder, and contributing to a reduction in weight.

In addition, according to the embodiment of the present disclosure, it is possible to obtain an advantageous effect of improving stability, reliability, and insulation performance by increasing the creeping distance between the terminals without changing the structure in which the terminals are disposed.

In addition, according to the embodiment of the present disclosure, it is possible to obtain an advantageous effect of simplifying a manufacturing process and reducing manufacturing time.

While the embodiments have been described above, but the embodiments are just illustrative and not intended to limit the present disclosure. It can be appreciated by those skilled in the art that various modifications and alterations, which are not described above, may be made to the present embodiment without departing from the intrinsic features of the present embodiment. For example, the respective constituent elements specifically described in the embodiments may be modified and then carried out. Further, it should be interpreted that the differences related to the modifications and alterations are included in the scope of the present disclosure defined by the appended claims.

What is claimed is:

1. A busbar unit for a motor, the busbar unit comprising:
a holder having an inner circumferential surface including crest portions and trough portions connected to the crest portions disposed thereon; and
a plurality of terminals coupled to the holder, each of the terminals comprising a plurality of first terminal portions disposed on the respective crest portions.

2. The busbar unit of claim 1, wherein the holder comprises:
a first body having an accommodation space at an upper side thereof and having an inner circumferential surface on which the crest portions and the trough portions are disposed; and
a second body connected to the first body and to which the plurality of terminals are fixed, and
wherein the first terminal portions protrude from an inner circumferential surface of the second body, and are disposed in the accommodation space and arranged at positions corresponding to the crest portions, respectively.

3. The busbar unit of claim 2, further comprising:
a cover layer disposed on an upper surface of the holder and covering the first terminal portions.

4. The busbar unit of claim 3, wherein the cover layer includes an insulating material filling the accommodation space.

5. The busbar unit of claim 3, wherein the first terminal portions are entirely embedded in the cover layer.

6. The busbar unit of claim 2, wherein the holder further comprises a protrusion portion protruding from an inner surface of the accommodation space.

7. The busbar unit of claim 6, wherein the protrusion portion is disposed on at least one of an upper surface of the first body or the inner circumferential surface of the second body.

8. The busbar unit of claim 6, wherein the protrusion portion is disposed between adjacent first terminal portions.

9. The busbar unit of claim 6, wherein the protrusion portion is provided in plural, and each of the first terminal portions penetrates between adjacent protrusion portions so as to be disposed in the accommodation space.

10. The busbar unit of claim 1, wherein the crest portions and the trough portions are disposed alternately in a circumferential direction of the holder.

11. The busbar unit of claim 1, wherein each of the terminals comprises:
a body accommodated in the holder; and
a second terminal portion extending from the body and protruding from an outer circumferential surface of the holder, and
wherein the first terminal portions extend from the body.

12. The busbar unit of claim 11, further comprising:
a support portion disposed on the outer circumferential surface of the holder and configured to support the second terminal portion.

13. The busbar unit of claim 12, wherein a stepped portion is disposed at an end of the support portion, and the second terminal portion is exposed to an outside through the stepped portion.

14. The busbar unit of claim 13, wherein the stepped portion is provided in plural, and the plurality of stepped portions are arranged such that the stepped portions are placed at different distances from the outer circumferential surface of the holder in a direction in which the second terminal portion protrudes, and
wherein the plurality of the stepped portions have different cross-sectional areas from one another.

15. The busbar unit of claim 11, wherein the bodies of the terminals are disposed to overlap each other in a radial direction.

16. The busbar unit of claim 11, wherein the second terminal portions of the plurality of terminals extend from the respective bodies in an angle less than a 90 degree.

17. The busbar unit of claim 16, wherein first end portions of the second terminal portions of the plurality of terminals have different shapes from each other, such that the first end portions are spaced apart from each other with more spaces than spaces between second end portions of the second terminal portions, opposing the first end portions.

18. The busbar unit of claim 1, wherein the plurality of terminals comprise a first terminal, a second terminal, and a third terminal, and
the first terminal portions of the first to third terminals are alternatively arranged in a circumferential direction, such that each of the first terminal portions of the first terminal is disposed immediately adjacent to one of the first terminal portions of the second terminal and each of the first terminal portions of the second terminal is disposed immediately adjacent to one of the first terminal portions of the third terminal.

19. The busbar unit of claim 1, wherein each of the first terminal portions extends in a radially inward direction and has a bent portion bent in a radially outward direction.

20. A busbar unit for a motor, the busbar unit comprising:
a holder having an inner circumferential surface including crest portions and trough portions connected to the crest portions disposed thereon; and
a terminal coupled to the holder and comprising first terminal portions disposed on the crest portions,
wherein the holder comprises:
a first body having an accommodation space at an upper side thereof and having an inner circumferential surface on which the crest portions and the trough portions are disposed; and
a second body connected to the first body and to which the terminal is fixed,
wherein the first terminal portions protrude from an inner circumferential surface of the second body, and are disposed in the accommodation space and arranged at positions corresponding to the crest portions, respectively,
wherein the holder further comprises a protrusion portion protruding from an inner surface of the accommodation space, and
wherein the protrusion portion is provided in plural, and the plurality of protrusion portions are respectively arranged between adjacent first terminal portions so as to be spaced apart from one another.

* * * * *